United States Patent
Li (10) Patent No.: US 11,328,168 B2
(45) Date of Patent: May 10, 2022

(54) IMAGE RECOGNITION METHOD AND APPARATUS

(71) Applicant: BEIJING XIAOMI MOBILE SOFTWARE CO., LTD., Beijing (CN)

(72) Inventor: Guosheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 27 days.

(21) Appl. No.: 16/213,724

(22) Filed: Dec. 7, 2018

(65) Prior Publication Data

US 2019/0180131 A1  Jun. 13, 2019

(30) Foreign Application Priority Data

Dec. 11, 2017 (CN) .......................... 201711305325.0

(51) Int. Cl.
  *G06K 9/20* (2006.01)
  *G06K 9/00* (2022.01)
  *G06K 9/22* (2006.01)
  *H05B 45/10* (2020.01)

(52) U.S. Cl.
  CPC ....... *G06K 9/2027* (2013.01); *G06K 9/00255* (2013.01); *G06K 9/228* (2013.01); *H05B 45/10* (2020.01)

(58) Field of Classification Search
  CPC ............. G06K 9/00255; G06K 9/2027; G06K 9/00268; G06K 9/00288; G06K 9/00221; G06K 9/4661
  See application file for complete search history.

(56) References Cited

U.S. PATENT DOCUMENTS

| | | | |
|---|---|---|---|
| 2010/0086217 A1* | 4/2010 | Matsuhira | H04N 5/23212 382/199 |
| 2013/0015946 A1 | 1/2013 | Lau et al. | |
| 2014/0348399 A1* | 11/2014 | Kuo | G06K 9/00288 382/118 |
| 2015/0015688 A1 | 1/2015 | Yang | |

(Continued)

FOREIGN PATENT DOCUMENTS

| | | |
|---|---|---|
| CN | 102122107 A | 7/2011 |
| CN | 102375669 A | 3/2012 |

(Continued)

OTHER PUBLICATIONS

European Search Report of EP Application No. 18211578.2 dated Apr. 16, 2019, (11p).

(Continued)

*Primary Examiner* — Margaret G Mastrodonato
(74) *Attorney, Agent, or Firm* — Arch & Lake LLP (57) ABSTRACT

An image recognition method and apparatus are provided. The method includes: acquiring a first brightness of a target side of an electronic device when an image recognition triggering operation for the electronic device is detected, wherein the electronic device is provided with an image capturing circuit and a light-emitting circuit; controlling the light-emitting circuit to complement the target side with light when the first brightness is less than a preset brightness threshold; controlling the image capturing circuit to capture a target image of the target side during light complement; and recognizing the target image.

15 Claims, 8 Drawing Sheets

(56) References Cited

U.S. PATENT DOCUMENTS

| | | | |
|---|---|---|---|
| 2015/0067821 | A1 | 3/2015 | Luo et al. |
| 2016/0360084 | A1 | 12/2016 | Zhao |
| 2019/0025672 | A1* | 1/2019 | Van Der Sijde ..... H04N 5/2256 |
| 2019/0037125 | A1 | 1/2019 | Jiang et al. |
| 2019/0102608 | A1* | 4/2019 | Wang ................ H04N 5/23219 |

FOREIGN PATENT DOCUMENTS

| | | |
|---|---|---|
| CN | 103793104 A | 5/2014 |
| CN | 104023116 A | 9/2014 |
| CN | 104159027 A | 11/2014 |
| CN | 104423843 A | 3/2015 |
| CN | 105141775 A | 12/2015 |
| CN | 105554413 A | 5/2016 |
| CN | 106331517 A | 1/2017 |
| CN | 107181913 A | 9/2017 |
| CN | 107193439 A | 9/2017 |
| CN | 107220621 A | 9/2017 |
| CN | 107277388 A | 10/2017 |
| CN | 107426427 A | 12/2017 |
| CN | 106031156 B | 10/2019 |
| IN | 106031156 A | 10/2016 |
| IN | 106506749 A | 3/2017 |

OTHER PUBLICATIONS

First Office Action of Chinese Application No. 201711305325.0 dated Oct. 25, 2021 with English translation, (19p).

* cited by examiner

IMAGE RECOGNITION METHOD AND APPARATUS

CROSS-REFERENCE TO RELATED APPLICATION

This application is based on and claims priority to Chinese Patent Application No. 201711305325.0 filed with the State Intellectual Property Office on Dec. 11, 2017 and titled "IMAGE RECOGNITION METHOD AND APPARATUS," the entire contents of which are incorporated herein by reference.

TECHNICAL FIELD

The present disclosure relates to electronic technology field, and more particularly to an image recognition method and apparatus.

BACKGROUND

With the development of electronic technology, in order to improve the safety of an electronic device (for example, in order to prevent data stored in the electronic device from being stolen by others), there are more and more ways to unlock the electronic device.

In the related art, the electronic device is provided with a camera, and the electronic device may be unlocked by face image recognition. Exemplarily, a user may control the electronic device to capture a face image of the user with the camera in advance. When it is necessary to unlock the electronic device, the user needs to place his/her face within the shooting range of the camera and controls the electronic device to capture a target image with the camera. Thereafter, the electronic device may determine whether the similarity between the target image and the pre-captured face image reaches a preset similarity threshold. The electronic device may recognize the target image and be unlocked when the similarity between the target image and the pre-captured user's face image reaches the preset similarity threshold.

When the user is in a dark environment, the target image captured by the camera on the electronic device contains fewer features, and the electronic device may not recognize the target image.

SUMMARY

The present disclosure provides an image recognition method and apparatus.

According to a first aspect of the present disclosure, there is provided an image recognition method. The method may include: acquiring a first brightness of a target side of an electronic device when an image recognition triggering operation for the electronic device is detected, wherein the electronic device is provided with an image capturing circuit and a light-emitting circuit; controlling the light-emitting circuit to emit light to complement the target side when the first brightness is less than a preset brightness threshold; controlling the image capturing circuit to capture a target image of the target side while the emitting circuit emits light to complement the target side; and recognizing the target image.

According to a second aspect of the present disclosure, there is provided an image recognition apparatus. The apparatus may include: a first acquisition module configured to acquire a first brightness of a target side of an electronic device when an image recognition triggering operation for the electronic device is detected, wherein the electronic device is provided with an image capturing circuit and a light-emitting circuit; a first control module configured to control the light-emitting circuit to complement the target side with light when the first brightness is less than a preset brightness threshold; a second control module configured to control a target image of the target side while the emitting circuit emits light to complement the target side; and a recognition module configured to recognize the target image.

According to a third aspect of the present disclosure, there is provided an image recognition apparatus. The apparatus may include: a processing circuit; and a memory for storing an executable instruction executed by the processing circuit; wherein the processing circuit is configured to: acquire a first brightness of a target side of an electronic device when an image recognition triggering operation for the electronic device is detected, wherein the electronic device is provided with an image capturing circuit and a light-emitting circuit; control the light-emitting circuit to complement the target side with light when the first brightness is less than a preset brightness threshold; control the image capturing circuit to capture a target image of the target side while the emitting circuit emits light to complement the target side; and recognize the target image.

According to a fourth aspect of the present disclosure, there is provided a computer readable storage medium comprising instructions. The instruction is executed by a processing circuit to enable the processing circuit to perform the image recognition method according According to a fifth aspect of the present disclosure, there is provided a program product comprising instructions. The program product is executed by a processing circuit to enable the processing circuit to implement the image recognition method above.

It is to be understood that both the foregoing general description and the following detailed description are exemplary and explanatory only and are not restrictive of the invention, as claimed.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure will be described in further detail with reference to the enclosed drawings, to clearly present the objects, technical solutions, and advantages of the present disclosure.

With the development of electronic technology, the application of image recognition technology becomes more and more extensive. For example, image recognition technology may be used for unlocking an electronic device. Exemplarily, if face recognition technology is used to unlock an electronic device, the electronic device needs to determine that the similarity between the features of the captured face image and the pre-stored face features is high, i.e., the captured image needs to be effectively recognized. If the face is in a dark environment, the electronic device may not recognize the image because the features of the acquired image and the pre-stored face features differ greatly. An embodiment of the present disclosure provides an image recognition method. With this method, the dark environment is complemented with light when the face is in the environment, so that the electronic device may acquire an image containing more accurate features, and then the recognition of the image may be performed successfully.

Figure 1:
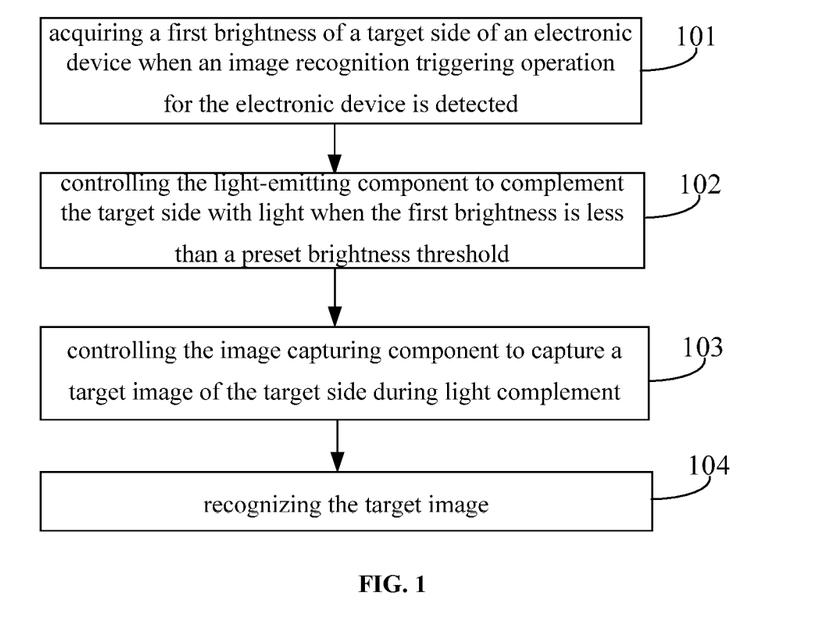
FIG. 1 is a flow chart of an image recognition method shown in accordance with an aspect of the disclosure.

FIG. 1 is a flow chart of an image recognition method shown according to an aspect of the disclosure, and the image recognition method may be applied to image recognition apparatus. The image recognition apparatus may be a smart phone, a smart watch, or any electronic device including an image capturing circuit and a light-emitting circuit. As shown in FIG. 1, the image recognition method may include the following steps.

In step 101, a first brightness of a target side of an electronic device is acquired when an image recognition triggering operation for the electronic device is detected. For example. The electronic device may obtain the first brightness of the target side when detecting that the image recognition operation is triggered but not yet started. The electronic device may detect that the image recognition operation is triggered when an object is approaching the electronic device from the target side, which may be the front side or the back side of the electronic device.

Here, the electronic device may be a device that is provided with an image capturing circuit and a light-emitting circuit. The image In step 102, the light-emitting circuit is controlled to complement the target side with light when the first brightness is less than a preset brightness threshold. For example, the electronic device may control the light-emitting circuit to emit light for a preset time period when the first brightness is less than a preset brightness threshold. In some embodiments, the electronic device may display a bright image on the display screen to complement the target side.

In step 103, the image capturing circuit is controlled to capture a target image of the target side during light complement. The electronic device may control the image capturing circuit to capture the target image while the emitting circuit emits light to complement the target side. For example, the electronic device may control the image capturing circuit to capture the target image during the preset time period. In some embodiments, the image capturing circuit may be instructed to capture the target image right at the end of the preset time period. Additionally or alternatively, the image capturing circuit may capture multiple images during the preset time period and select one of them as the target image.

In step 104, the target image is recognized. The target image may be processed according to ambient light intensity and then send to a neural network for image recognition.

In summary, in the image recognition method according to the embodiments of the present disclosure, before unlocking the electronic device, the image recognition apparatus may acquire a first brightness of an image capturing side of the image capturing circuit, and the light-emitting circuit in the electronic device is controlled to complement the image capturing side of the image capturing circuit with light when the first brightness is less than a preset brightness threshold. When the brightness of the image capturing side of the image capturing circuit is low, the electronic device may also capture an image containing more features by light complement, and then the captured image may be recognized based on the more features.

Figure 2:
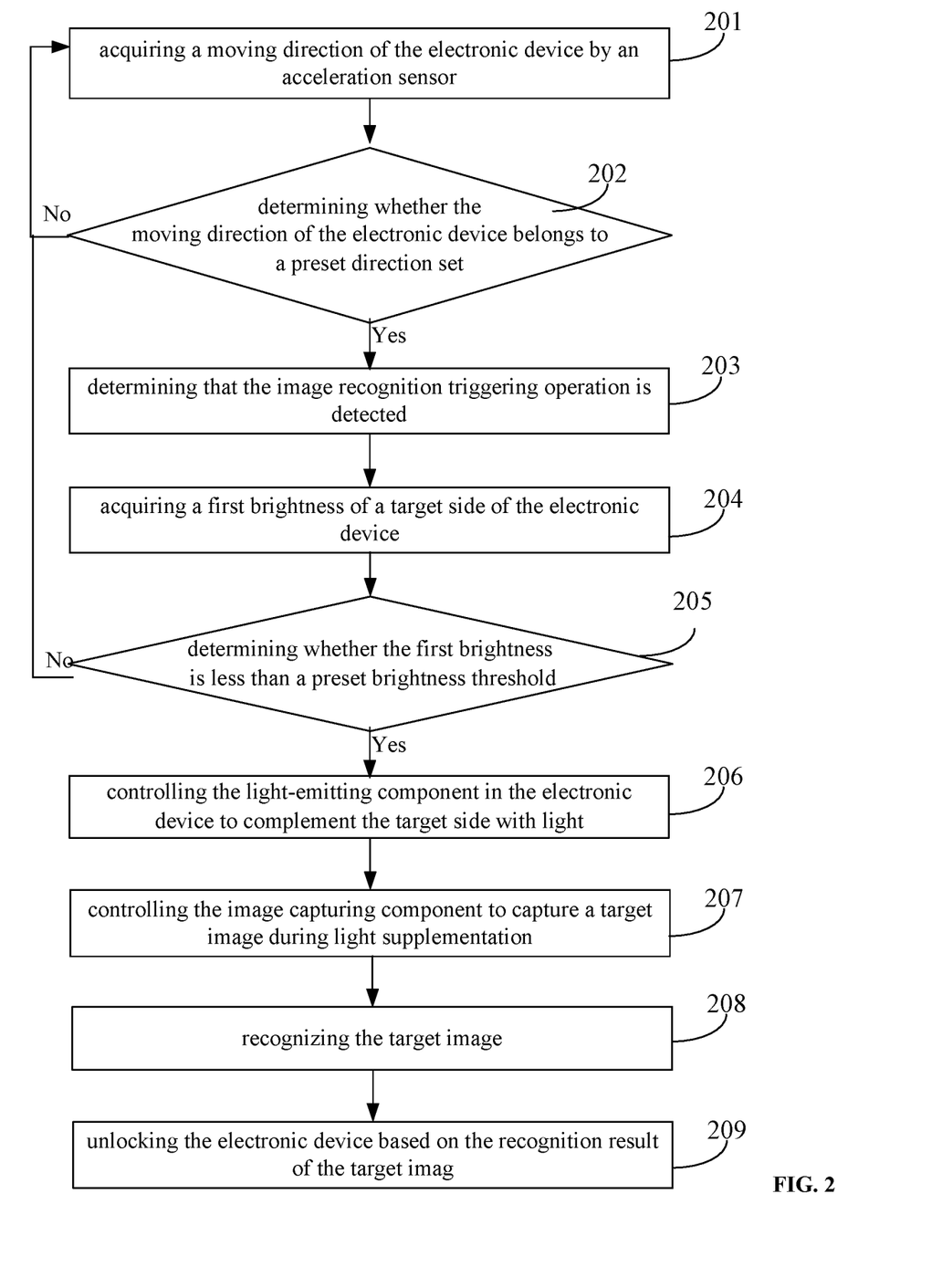
FIG. 2 is a flow chart of another image recognition method shown in accordance with an aspect of the disclosure.

FIG. 2 is a flow chart of another image recognition method shown according to an aspect of the disclosure. The image recognition method may be applied to an image recognition apparatus. It should be noted that the embodiment of the present disclosure takes the case of the image recognition method used for unlocking an electronic device as an example. In practice, the image recognition method may also be used in other scenarios, which is not limited in the embodiment of the present disclosure. The electronic device may include the image recognition apparatus or be independent from the image recognition apparatus. As shown in FIG. 2, the image recognition method may include the following steps.

In step 201, a moving direction of the electronic device is acquired by an acceleration sensor. Step 202 is performed.

The electronic device may be provided with an acceleration sensor, and the image recognition apparatus may detect, by means of the acceleration sensor, the acceleration of the electronic device when it moves, and further determine the direction of the detected acceleration as the moving direction of the electronic device. Exemplarily, referring to FIG. 3, the electronic device 301 may be a mobile phone. When the mobile phone is lifted from a horizontal state A to a tilted state B, the image recognition apparatus may determine, by means of the acceleration sensor in the electronic device, that the moving direction of the mobile phone is direction x in the figure.

In step 202, it is determined whether the moving direction of the electronic device belongs to a preset direction set. Step 203 is performed when the moving direction of the electronic device belongs to the preset direction set. Step 201 is performed when the moving direction of the electronic device does not belong to the preset direction set.

The preset direction set may be stored in the image recognition apparatus. After acquiring the moving direction of the electronic device, the image recognition apparatus may determine whether the moving direction belongs to the preset direction set.

In step 203, it is determined that the image recognition triggering operation is detected. Step 204 is performed.

The image recognition triggering operation may be a triggering operation for an image recognition unlocking function of the electronic device. When the moving direction of the electronic device belongs to the preset direction set, the image recognition apparatus may determine that the image recognition triggering operation is detected. Exemplarily, with continued reference to FIG. 3, when the preset direction set includes the direction x, the image recognition apparatus of the electronic device 301 may determine that the image recognition triggering operation is detected.

Figure 3:
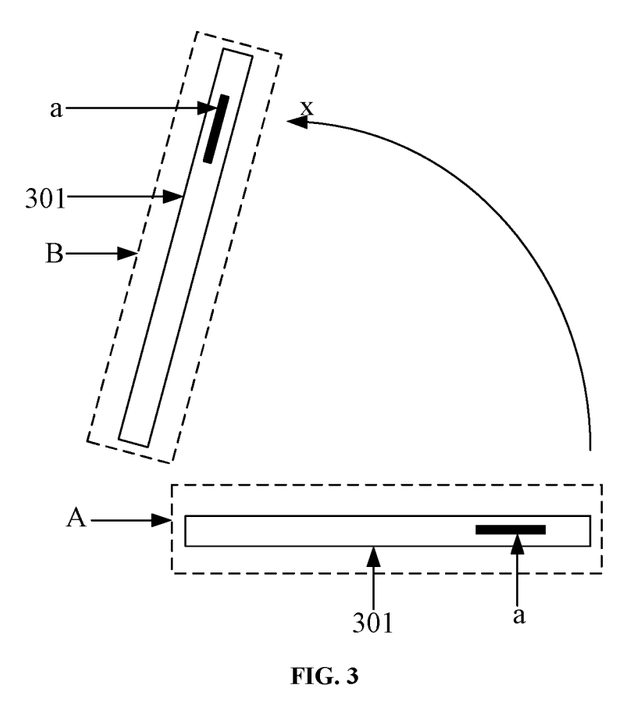
FIG. 3 is a scenario diagram of moving of an electronic device shown in accordance with an aspect of the disclosure.

Alternatively or additionally, the electronic device may further include a function key. After the image recognition apparatus detects that the function key is pressed, it may be determined that the image recognition triggering operation is detected. Exemplarily, with continued reference to FIG. 3, the electronic device 301 may be provided with a function key a, and the function key a may include a corresponding signal generation circuit. When the function key a is pressed, the signal generation circuit may generate a pressing signal and send it to the image recognition apparatus of the electronic device 301. After the image recognition apparatus of the electronic device 301 receives the pressing signal, it may be determined that the function key a is pressed, and it may be further determined that the image recognition triggering operation is detected. It should be noted that the embodiment of the present disclosure only takes an example in which the function key provided on a side of the electronic device as shown in FIG. 3 and the image recognition triggering operation is the function key being pressed for illustration. In practice, the function key may also be provided at other portions of the electronic device, and the image recognition triggering operation may also be other operations, which is not limited in the embodiments of the present disclosure.

In step 204, a first brightness of a target side of the electronic device is acquired. Step 205 is performed.

Figure 4:
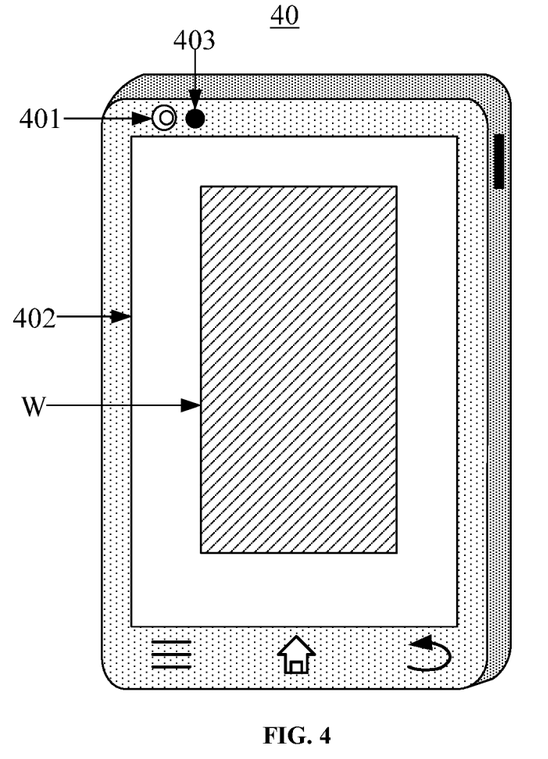
FIG. 4 is a structural schematic diagram of an electronic device shown in accordance with an aspect of the disclosure.

The electronic device may be provided with an image capturing circuit, and the image capturing side of the image capturing circuit may be the target side of the electronic device. The image recognition apparatus may acquire the first brightness of the image capturing side of the image capturing circuit. Exemplarily, as shown in FIG. 4, the electronic device may be a mobile phone 40, and the image capturing circuit may be the front camera 401 of the mobile phone. When it is determined that the image recognition triggering operation is detected, the image recognition apparatus may acquire the brightness of the image capturing side of the front camera 401.

In step 205, it is determined whether the first brightness is less than a preset brightness threshold. Step 206 is performed when the first brightness is less than the preset brightness threshold. Step 201 is performed when the first brightness is greater than or equal to the preset brightness threshold.

After acquiring the first brightness, the image recognition apparatus may acquire the preset brightness threshold and determine whether the first brightness is less than the preset brightness threshold. The preset brightness threshold may be a pre-stored brightness that is obtained statistically.

It should be noted that, since the image capturing circuit captures an image through the light reflection of an object. The object may not reflect light when the object is in an environment with a very low brightness, and therefore the image capturing circuit may not capture an image containing more features of the object. Exemplarily, when the object is in an environment with a brightness greater than or equal to the preset brightness threshold, the image captured by the image capturing circuit may contain sufficient features of the object. When the object is in an environment with a brightness less than the preset brightness threshold, the image captured by the image capturing circuit contains fewer features of the object.

In step 206, the light-emitting circuit in the electronic device is controlled to complement the target side with light. Step 207 is performed.

The electronic device may be provided with a light-emitting circuit, and the light-emitting side of the light-emitting circuit may be the image capturing side of the image capturing circuit (i.e., the target side of the electronic device). When the first brightness is less than the preset brightness threshold, it indicates that the brightness of the target side of the electronic device is low, and the image captured by the image recognition apparatus by means of the image capturing circuit contains fewer features of the object on the target side. In order to enable the image recognition apparatus to capture an image containing more object features by means of the image capturing circuit, the image recognition apparatus may control the light-emitting circuit in the electronic device to complement the target side with light.

In the step 206, there may be a variety of possible implementations for the image recognition apparatus to control the light-emitting circuit to complement the target side with light. In the following, only two of the possible implementations are taken as an example for illustration.

In a first possible implementation, the light-emitting circuit may be a display screen, and the display side of the display screen (i.e., the light-emitting side of the display screen) may be the target side. The image recognition apparatus may control all or a part of the display area of the display screen to emit at least one color of light.

With continued reference to FIG. 4, the electronic device 40 may include a display screen 402, and the display side of the display screen 402 is the image capturing side (i.e., the target side) of the image capturing circuit (e.g., the front camera 401). When it is necessary to complement the target side of the electronic device 40 with light, the image recognition apparatus of the electronic device 40 may control all or a part of the display area W of the display screen 402 to emit at least one color of light. For example, the image recognition apparatus of the electronic device 40 may control all or a part of the display area W of the display screen 402 to emit white light, or control a part of the display area W of the display screen 402 to emit red light and the remaining part of the display area to emit blue light. It should be noted that the embodiment of the present disclosure only takes a part of the display area being the area W shown in FIG. 4 as an example for illustration. In practice, the part of the display area may also be a display area having other shapes or at other positions in the display screen, and the color of the light emitted by the display area may also be other colors, which is not limited in the embodiment of the present disclosure.

When the image recognition apparatus controls all or a part of the display area of the display screen to emit at least one color of light, it may control all or a part of the display area of the display screen 402 to display a preset image so that all or a part of the display area of the display screen 402 emits light of at least one color.

When the image recognition apparatus controls all or a part of the display area of the display screen to emit at least one color of light, a first initial image may also be captured by the image capturing circuit, and then a second initial image may be generated based on the first initial image, wherein the brightness of the pixels in the second initial image is negatively correlated with the brightness of the pixels in the first initial image. Finally, the image recognition apparatus may control all or a part of the display area of the display screen to display the second initial image. Exemplarily, referring to FIG. 5, when the image recognition apparatus determines that the target side needs to be complemented with light, it may control the image capturing circuit to capture a first initial image P1, generate a second initial image P2 based on the first initial image P1, and control all or a part of the display area of the display screen to display the second initial image P2.

Figure 5:
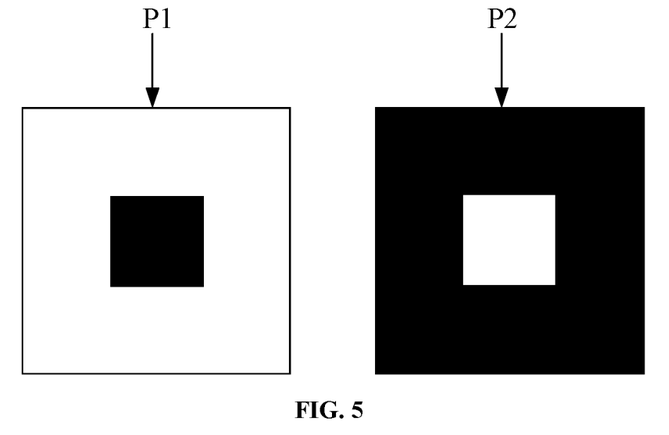
FIG. 5 is a schematic diagram of an initial image shown in accordance with an aspect of the disclosure.

For example, each of the first initial image P1 and the second initial image P2 includes 36 pixels arranged in 6 rows and 6 columns. Referring to Table 1 and Table 2, Table 1 shows the brightness values of the pixels in the first initial image P1, Table 2 shows the brightness values of the pixels in the second initial image P2, and the brightness of the pixels in the second initial image P2 is negatively correlated with the brightness of the pixels in the first initial image P1. It should be noted that both "0" and "255" in Table 1 and Table 2 represent the brightness value of the pixel at the position. The pixels with the brightness value of 0 may appear as black, and the pixels with the brightness value of 255 may appear as white.

TABLE 1

| 255 | 255 | 255 | 255 | 255 | 255 |
| --- | --- | --- | --- | --- | --- |
| 255 | 255 | 255 | 255 | 255 | 255 |
| 255 | 255 | 0 | 0 | 255 | 255 |
| 255 | 255 | 0 | 0 | 255 | 255 |
| 255 | 255 | 255 | 255 | 255 | 255 |
| 255 | 255 | 255 | 255 | 255 | 255 |

TABLE 2

| 0 | 0 | 0 | 0 | 0 | 0 |
| --- | --- | --- | --- | --- | --- |
| 0 | 0 | 0 | 0 | 0 | 0 |
| 0 | 0 | 255 | 255 | 0 | 0 |
| 0 | 0 | 255 | 255 | 0 | 0 |
| 0 | 0 | 0 | 0 | 0 | 0 |
| 0 | 0 | 0 | 0 | 0 | 0 |

In a second possible implementation, the light-emitting direction of the light-emitting circuit is adjustable. When the target side needs to be complemented with light, the image recognition apparatus may control the image capturing circuit to capture a third initial image, and then determine an area to be complemented with light of the target side based on the third initial image, and adjust the light-emitting direction of the light-emitting circuit so that the light-emitting circuit emits light to the area to be complemented with light. The area to be complemented with light may be an area on the target side having a low brightness.

Exemplarily, with continued reference to FIG. 4, the electronic device 40 may be provided with a light-emitting circuit 403 (e.g., a complement light), and the light-emitting circuit 403 may emit light toward the upward, downward, left, right, upper left, lower left, upper right, lower right and central directions. The image recognition apparatus of the electronic device 40 may, when it is necessary to control the light-emitting circuit 403 to complement the target side with light, control the image capturing circuit (e.g., the front camera 401) to capture the third initial image. The image recognition apparatus of the electronic device 40 may then equally divide the third initial image into nine parts corresponding to the nine directions, and calculate the average brightness value of all the parts, and the area on the target side corresponding to the part with the lowest average value is determined to be the area to be complemented with light. Thereafter, the image recognition apparatus of the electronic device 40 may adjust the light-emitting direction of the light-emitting circuit 403 so that the light-emitting circuit 403 emits light to the area to be complemented with light.

Figure 6:
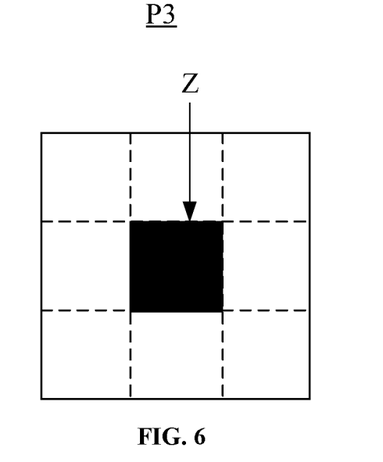
FIG. 6 is a schematic diagram of a third initial image shown in accordance with an aspect of the disclosure.

For example, as shown in FIG. 6, the image recognition apparatus captures a third initial image P3 by means of the image capturing circuit, and the average brightness value of the central portion Z of the third initial image P3 is the lowest, and then the image recognition apparatus may determine that the area on the target side corresponding to the central portion Z is an area to be complemented with light, and may control the light-emitting circuit to emit light toward the central direction to complement the area to be complemented with light with light.

In some embodiments, no matter which of the aforementioned ways is used by the image recognition apparatus to control the light-emitting circuit in the electronic device to complement the target side with light, the image recognition apparatus may control the light-emitting circuit in the electronic device to complement the target side with light for a preset duration. The preset duration may be preset or may be set by the user, which is not limited in the embodiment of the present disclosure.

In addition, the electronic device may be further provided with a distance sensor. The distance sensor may be configured to detect a target distance between the image capturing circuit and an obstacle on the target side. The image recognition apparatus may acquire the target distance by the distance sensor and determine a target brightness based on the target distance to control the light-emitting circuit of the electronic device to emit light having the target brightness to the target side. The target distance may be positively correlated with the target brightness. That is, no matter which of the aforementioned ways is used by the image recognition apparatus to control the light-emitting circuit in the electronic device to complement the target side with light, the image recognition apparatus may determine a target brightness based on target distance before controlling the light-emitting circuit in the electronic device to emit light having the target brightness. For example, when the light-emitting circuit may emit light having at least one target brightness, the image recognition apparatus may determine the target brightness based on the target distance before controlling the light-emitting circuit to emit each light having the target brightness.

Exemplarily, the obstacle on the target side may be a user's face, and the distance between the user's face and the image capturing circuit is the target distance. The preset duration may be 3 seconds. When the user's face is close to the image capturing circuit (for example, the target distance is 20 cm), the light-emitting circuit in the electronic device may emit light having a low brightness for 3 seconds (for example, the target brightness is 80 nits), so as to avoid a waste of power. When the user's face is far away from the image capturing circuit (for example, the target distance is 30 cm), the light-emitting circuit in the electronic device may emit light having a high brightness for 3 seconds (for example, the target brightness is 130 nits), so that the user's face may reflect more light toward the image capturing circuit.

In step 207, the image capturing circuit is controlled to capture a target image during light complement. Step 208 is performed.

When the light-emitting circuit in the electronic device complements the target side with light, the object on the target side may reflect the light emitted by the light-emitting circuit in the electronic device, and then the image captured by the image capturing circuit of the electronic device may contain multiple features of the object on the target side. Here, the image recognition apparatus may control the image capturing circuit to capture the target image (i.e., the image of the object on the target side of the electronic device).

In step 208, the target image is recognized. Step 209 is performed.

The image recognition apparatus may first extract the features of the target image captured by the image capturing circuit, and then acquire the similarity between the features of the target image and the features of the preset image. The image recognition apparatus may then determine whether the acquired similarity is greater than or equal to a preset similarity threshold, and determine that the target image is successfully recognized when the similarity is greater than or equal to the preset similarity threshold. When the similarity is less than the preset similarity threshold, the image recognition apparatus may determine that the target image is not successfully recognized, and may control the electronic device to display prompt information to prompt the user that the target image fails to be recognized.

Exemplarily, when the target image captured by the image capturing circuit is a user's face image, the image recognition apparatus may extract the features of the face image, for example, the shape of the eyes, the shape of the mouth, and the level of the cheekbones. The image recognition apparatus may then compare the extracted features of the target image with the pre-stored features of a preset image, and calculate the similarity therebetween. The preset image may be the face image of the holder of the electronic device that is pre-recorded into the image recognition apparatus by the holder, and the image recognition apparatus may extract the features of the face image and store them. Next, the image recognition apparatus may determine whether the acquired similarity is greater than or equal to a preset similarity threshold. When the similarity is greater than or equal to the preset similarity threshold, the image recognition apparatus may determine that the target image is the face image of the holder of the electronic device, and then may determine that the target image is successfully recognized. When the similarity is smaller than the preset similarity threshold, the image recognition apparatus may determine that the target image is not the face image of the holder of the electronic device, and then may display prompt information to prompt the user that the image fails to be recognized.

In step 209, the electronic device is unlocked based on the recognition result of the target image.

Exemplarily, when it is determined that the target image is successfully recognized in step 208, that is, the image recognition apparatus determines that the user who unlocks the electronic device is the holder of the electronic device, the electronic device may be unlocked.

In the image recognition method according to the embodiment of the present disclosure, when the user needs to recognize an image, the user may lift the electronic device or press the function key of the electronic device so that the image recognition apparatus detects the image recognition triggering operation (i.e., the triggering operation for the image recognition unlocking function). The image recognition apparatus may then determine whether the brightness of the target side of the electronic device is lower than a preset brightness threshold. When the brightness of the target side is lower than the preset brightness threshold, the light-emitting circuit in the electronic device may be controlled to complement the target side with light. During the process that the light-emitting circuit in the electronic device complements the target side with light, the image recognition apparatus may control the image capturing circuit to capture a target image, and determine that the target image is successfully recognized when the similarity between the features of the target image and the features of the preset image is greater than or equal to the preset similarity threshold.

In summary, in the image recognition method according to the embodiment of the present disclosure, when it is necessary to unlock the electronic device, the image recognition apparatus may acquire a first brightness of an image capturing side of the image capturing circuit, and when the first brightness is less than a preset brightness threshold, the light-emitting circuit in the electronic device is controlled to complement the image capturing side of the image capturing circuit with light. In this way, when the brightness of the image capturing side of the image capturing circuit is low, the electronic device may also capture an image containing more features by light complement, and then the captured image may be recognized based on the more features.

Figure 7:
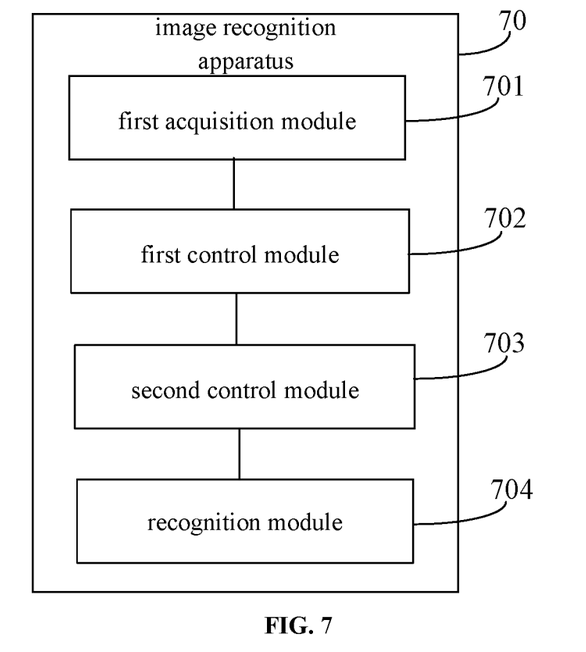
FIG. 7 is a structural schematic diagram of an image recognition apparatus shown in accordance with an aspect of the disclosure.

FIG. 7 is a structural schematic diagram of an image recognition apparatus shown in accordance with an aspect of the disclosure. As shown in FIG. 7, the image recognition apparatus 70 may include: a first acquisition module 701 configured to acquire a first brightness of a target side of an electronic device when an image recognition triggering operation for the electronic device is detected, wherein the electronic device is provided with an image capturing circuit and a light-emitting circuit; a first control module 702 configured to control the light-emitting circuit to complement the target side with light when the first brightness is less than a preset brightness threshold; a second control module 703 configured to control the image capturing circuit to capture a target image of the target side during light complement; and a recognition module 704 configured to recognize the target image.

In summary, in the image recognition apparatus according to the embodiment of the present disclosure, when it is necessary to unlock the electronic device, the first acquisition module may acquire a first brightness of an image capturing side of the image capturing circuit, and when the first brightness is less than a preset brightness threshold, the first control module may control the light-emitting circuit in the electronic device to complement the image capturing side of the image capturing circuit with light. In this way, when the brightness of the image capturing side of the image capturing circuit is low, the second control module may also capture an image containing more features by light complement, and then the recognition module may recognize the captured image based on the more features.

Figure 8:
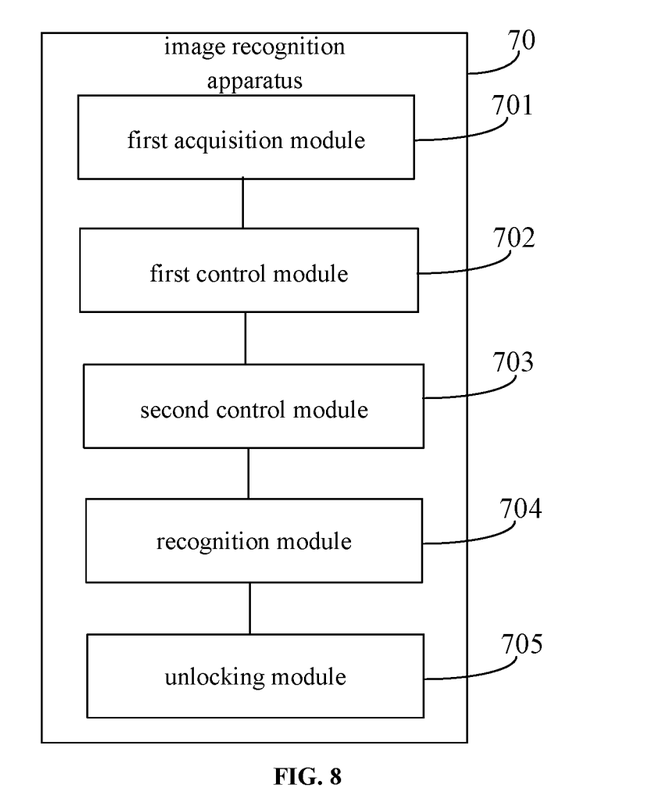
FIG. 8 is a structural schematic diagram of another image recognition apparatus shown in accordance with an aspect of the disclosure.

In some embodiments, FIG. 8 is a structural schematic diagram of another image recognition apparatus shown in accordance with an aspect of the disclosure. As shown in FIG. 8, on the basis of FIG. 7, the image recognition apparatus 70 may further include: an unlocking module 705 configured to unlock the electronic device based on a recognition result of the target image.

Figure 9:
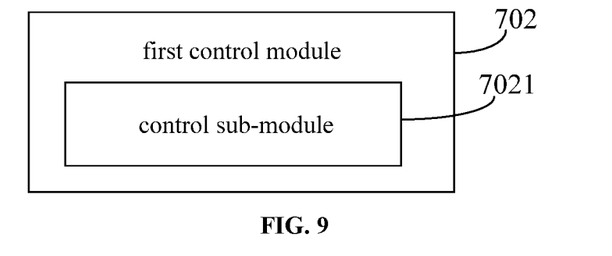
FIG. 9 is a structural schematic diagram of a first control module shown in accordance with an aspect of the disclosure.

In some embodiments, the light-emitting circuit may include a display screen. As shown in FIG. 9, the first control module 702 may include: a control sub-module 7021 configured to control all or a part of the display area of the display screen to emit at least one color of light.

In some embodiments, the control sub-module 7021 may be configured to: control the image capturing circuit to capture a first initial image of the target side; generate a second initial image based on the first initial image, wherein a brightness of the pixels in the second initial image is negatively correlated with a brightness of the pixels in the first initial image; and control all or a part of the display area of the display screen to display the second initial image.

In some embodiments, the control sub-module 7021 may be configured to: control all or a part of the display area of the display screen to display a preset image.

In some embodiments, the light-emitting direction of the light-emitting circuit is adjustable and the first control module 702 may be configured to: control the image capturing circuit to capture a third initial image of the target side; determine an area to be complemented with light of the target side based on the third initial image; and adjust the light-emitting direction of the light-emitting circuit to enable the light-emitting circuit to emit light to the area to be complemented with light.

In some embodiments, the electronic device is further provided with a distance sensor configured to a target distance between the image capturing circuit and an obstacle on the target side. The first control module 702 may be configured to: acquire the target distance by the distance sensor; determine a target brightness based on the target distance, wherein the target distance is positively correlated with the target brightness; and control the light-emitting circuit to emit light having the target brightness to the target side.

In some embodiments, the first control module 702 may be configured to: control the light-emitting circuit to complement the target side with light for a preset duration.

Figure 10:
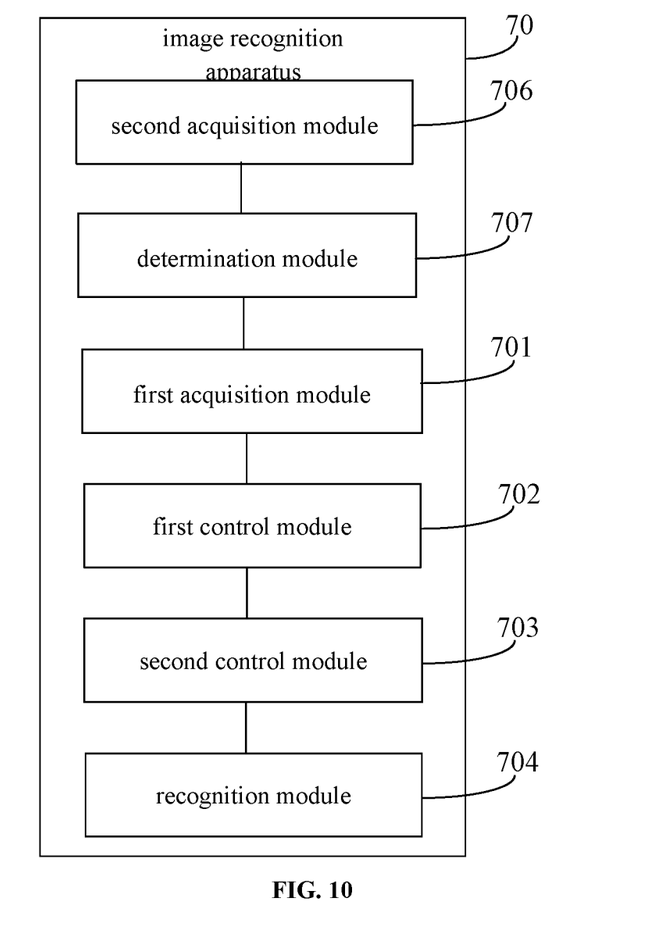
FIG. 10 is a structural schematic diagram of another image recognition apparatus shown in accordance with an aspect of the disclosure.

In some embodiments, the electronic device may further be provided with an acceleration sensor. FIG. 10 is a structural schematic diagram of another image recognition apparatus shown in accordance with an aspect of the disclosure. As shown in FIG. 10, the image recognition apparatus 70 may further include: a second acquisition module 706 configured to acquire a moving direction of the electronic device by the acceleration sensor; and a determination module 707 configured to determine that the image recognition triggering operation is detected when the moving direction belongs to a preset direction set.

In summary, in the image recognition apparatus according to the embodiment of the present disclosure, when it is necessary to unlock the electronic device, the first acquisition module may acquire a first brightness of an image capturing side of the image capturing circuit, and when the first brightness is less than a preset brightness threshold, the first control module may control the light-emitting circuit in the electronic device to complement the image capturing side of the image capturing circuit with light. In this way, when the brightness of the image capturing side of the image capturing circuit is low, the second control module may also capture an image containing more features by light complement, and then the recognition module may recognize the captured image based on the more features.

Figure 11:
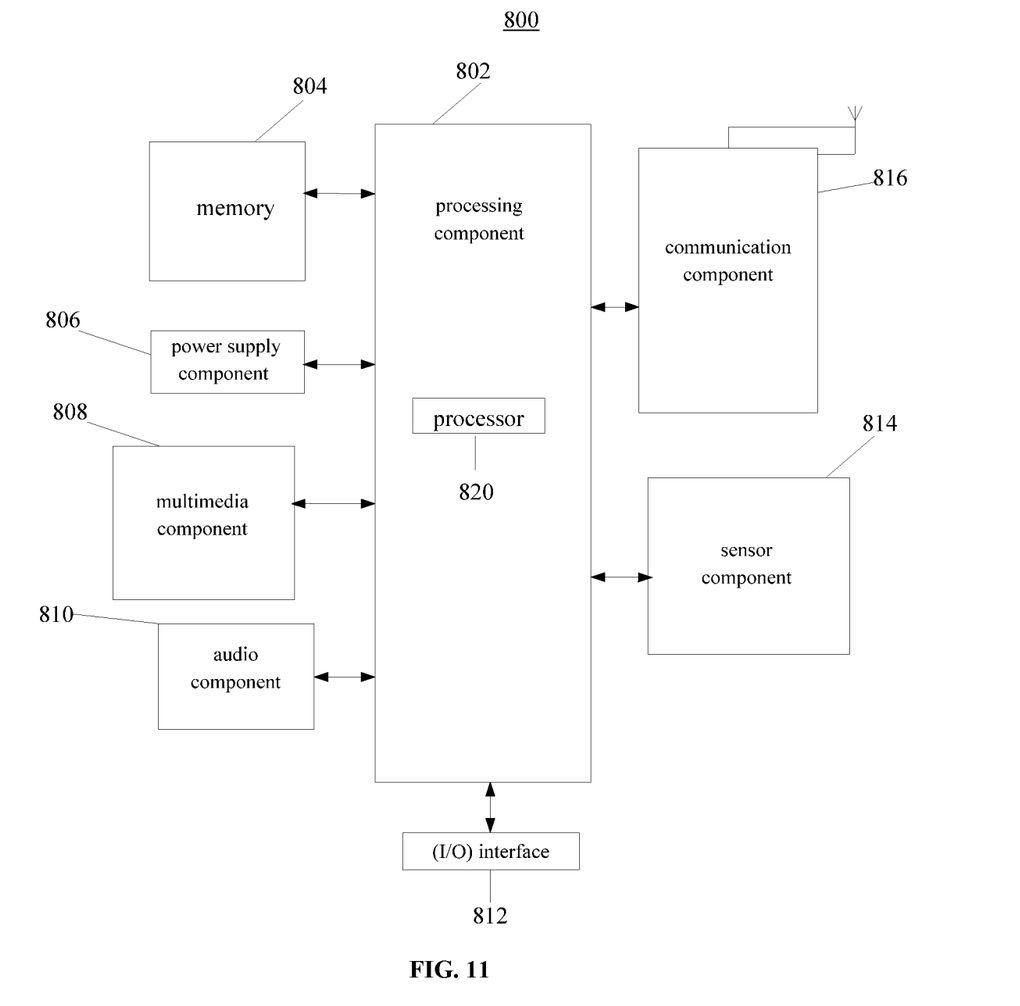
FIG. 11 is a block diagram of an image recognition apparatus shown in accordance with an aspect of the disclosure.

FIG. 11 is a block diagram of an image recognition apparatus shown in accordance with an aspect of the disclosure. For example, the image recognition apparatus 800 may be a mobile phone, a computer, a digital broadcast terminal, a messaging device, a game console, a tablet device, a medical device, a fitness device, a personal digital assistant, and the like. The electronic device may include the image recognition apparatus, or the image recognition apparatus is independent from the electronic device, which is not limited in the embodiments of the present disclosure.

As shown in FIG. 11, the apparatus 800 may include one or more of the following components: a processing circuit 802, a memory 804, a power supply component 806, a multimedia component 808, an audio component 810, an input/output (I/O) interface 812, a sensor component 814, and a communication component 816.

The processing circuit 802 generally may control the overall operation of the apparatus 800, such as operations associated with display, phone call, data communication, camera operation, and recording operation. The processing circuit 802 may include one or more processors 820 to execute instructions, to complete all or part of the steps described above. In addition, the processing circuit 802 may include one or more modules to facilitate the interactions between the processing circuit 802 and other components. For example, the processing circuit 802 may include a multimedia module to facilitate interaction between the multimedia component 808 and the processing circuit 802.

The memory 804 may be configured to store various types of data to support the operation of the apparatus 800. Examples of such data can include instructions of any application or method operating on the apparatus 800, contact data, phonebook data, messages, pictures, videos, and the like. The memory 804 may be implemented by any type of volatile or nonvolatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 806 can provide power to the various components of the apparatus 800. The power supply component 806 may include a power management system, one or more power supplies, and other components associated with generating, managing, and distributing power for the apparatus 800.

The multimedia component 808 may include a screen providing an output interface between the apparatus 800 and the user. In some embodiments, the screen may include a liquid crystal display (LCD) and a touch panel (TP). If the screen includes a touch panel, the screen may be implemented as a touch screen to receive input signals from the user. The touch panel can include one or more touch sensors to sense touches, slides, and gestures on touch panels. The touch sensors may sense not only the boundary of the touch or slide actions, but also the duration and pressure associated with the touch or slide operation. In some embodiments, the multimedia component 808 may include a front camera and/or a rear camera. When the apparatus 800 is at an operating mode, such as a shooting mode or a video mode, the front camera and/or the rear camera can receive external multimedia data. Each front camera and rear camera can be a fixed optical lens system or have focal length and optical zoom capability.

The audio component 810 may be configured to output and/or input an audio signal. For example, the audio component 810 can include a microphone (MIC) that is configured to receive external audio signals when the apparatus 800 is in the operating mode, such as a call mode, a recording mode, and a voice recognition mode. The received audio signals may be further stored in the memory 804 or transmitted via the communication component 816. In some embodiments, the audio component 810 may also include a speaker for outputting the audio signals.

The I/O interface 812 may provide the interface between the processing circuit 802 and a peripheral interface module. The peripheral interface module may be a keyboard, a mouse, buttons, or the like. The buttons may include, but are not limited to, a home button, a volume button, a start button, and a lock button.

The sensor component 814 may include one or more sensors for providing condition assessments of the various aspects of the apparatus 800. For example, the sensor component 814 may detect the on/off state of the apparatus 800, the relative positioning of the components, such as the components can be the display and keypad of the apparatus 800, and the sensor component 814 may also detect position changes of the apparatus 800 or any component thereof, presence or absence of the user contact with the apparatus 800, orientation, acceleration/deceleration, or the temperature changes of the apparatus 800. The sensor component 814 may include a proximity sensor configured to detect the presence of a nearby object without any physical contact. The sensor component 814 may also include a light sensor, such as a CMOS or CCD image sensor, for imaging applications. In some embodiments, the sensor component 814 may also include acceleration sensors, gyro sensors, magnetic sensors, pressure sensors, or temperature sensors.

The communication component 816 can be configured to facilitate wired or wireless communication between the apparatus 800 and other apparatuses. The apparatus 800 may access a wireless network based on a communication standard, such as WiFi, 2G or 3G, or a combination thereof. In an aspect of the disclosure, the communication component 816 can receive broadcast signals or broadcast-related information from an external broadcast management system via broadcast channels. In an aspect of the disclosure, the communication component 816 can also include a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other techniques.

In an aspect of the disclosure, the apparatus 800 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components for performing the method described above.

In an aspect of the disclosure, there is also provided a non-transitory computer readable storage medium comprising instructions, such as the memory 804 including the instructions. The instructions may be executed by the processor 820 of the apparatus 800 to complete the method described above. For example, the non-transitory computer readable storage medium may be a ROM, a random access memory (RAM), a CD-ROM, a magnetic tape, a floppy disk, an optical data storage device, etc.

The present disclosure further provides a program product comprising instructions. The program product causes the processing circuit to perform the image recognition method described when operating in a processing circuit.

It should be noted that, the image recognition apparatus provided in the above embodiments is exemplified only by the above division of each of the functional modules when the image recognition apparatus recognizes an image. In practice, the above-described functions may be assigned and completed by different functional modules in accordance with requirements, such that the internal structure of the image recognition apparatus may be divided into different functional modules to complete all or part of the functions described above. In addition, all or a part of the above embodiments may be implemented by a software, a hardware, a firmware or any combination thereof. When implemented by a software, all or a part of the above embodiments may be implemented in the form of a program product, which comprises one or more instructions.

It should be noted that the method embodiments and the corresponding apparatus embodiments provided in the present disclosure may be made references to each other, which is not limited in the embodiments of the present disclosure. The order of the steps in the method embodiments of the present disclosure is adjustable, and the steps may also be added or reduced. Within the technical scope in the present disclosure, any variations of the methods easily derived by a person of ordinary skill in the art shall fall within the scope of the protection of the present disclosure, which is not repeated here.

The foregoing are only optional embodiments of the present disclosure, which are not intended to limit the present disclosure. Within the spirit and principles of the disclosure, any modifications, equivalent substitutions, improvements, etc., are within the scope of protection of the present disclosure.

What is claimed is:

1. An image recognition method, comprising:
acquiring, by an electronic device comprising an image capturing circuit and a light-emitting circuit, a first brightness of a target side of the electronic device when an image recognition triggering operation for the electronic device is detected, wherein the light-emitting circuit comprises a display screen;
controlling the image capturing circuit to capture a first initial image of the target side;
generating a second initial image based on the first initial image, wherein a brightness of pixels in the second initial image is negatively correlated with a brightness of pixels in the first initial image;
controlling all or a part of a display area of the display screen to display the second initial image to control all or the part of the display area of the display screen to emit at least one color of light to complement the target side when the first brightness is less than a preset brightness threshold;
controlling the image capturing circuit to capture a third initial image of the target side;
dividing the third initial image into a plurality of parts;
calculating an average brightness value of each part of the plurality of parts;
determining an area on the target side corresponding to a part with a lowest average value as an area to be complemented with light;
controlling the image capturing circuit to capture a target image of the target side while the emitting circuit emits light to complement the target side; and
recognizing the target image.

2. The method according to claim 1, wherein the image recognition triggering operation is a triggering operation for an image recognition unlocking function of the electronic device, and the method further comprises:
unlocking the electronic device based on a recognition result of the target image.

3. The method according to claim 1, wherein controlling all or the part of the display area of the display screen to emit at least one color of light comprises:
controlling all or the part of the display area of the display screen to display a preset image.

4. The method according to claim 1, wherein a light-emitting direction of the light-emitting circuit is adjustable, and controlling the light-emitting circuit to emit light to complement the target side comprises:
adjusting the light-emitting direction of the light-emitting circuit to enable the light-emitting circuit to emit light to the area to be complemented with light.

5. The method according to claim 1, wherein the electronic device is further provided with a distance sensor configured to detect a target distance between the image capturing circuit and an obstacle on the target side, and controlling the light-emitting circuit to emit light to complement the target side comprises:
acquiring by the distance sensor the target distance;
determining a target brightness based on the target distance, wherein the target distance is positively correlated with the target brightness; and
controlling the light-emitting circuit to emit light having the target brightness to the target side.

6. The method according to claim 1, wherein controlling the light-emitting circuit to emit light to complement the target side comprises:
controlling the light-emitting circuit to complement the target side with light for a preset duration.

7. The method according to claim 1, wherein the electronic device is further provided with an acceleration sensor, and the method further comprises:
acquiring by the acceleration sensor a moving direction of the electronic device; and determining that the image recognition triggering operation is detected when the moving direction belongs to a preset direction set.

8. An image recognition apparatus, comprising:
a processing circuit;
a memory for storing executable instructions executed by the processing circuit;
wherein the processing circuit is configured to:
acquire a first brightness of a target side of an electronic device when an image recognition triggering operation for the electronic device is detected, wherein the electronic device is provided with an image capturing circuit and a light-emitting circuit, and the light-emitting circuit comprises a display screen;
control the image capturing circuit to capture a first initial image of the target side;
generate a second initial image based on the first initial image, wherein a brightness of pixels in the second initial image is negatively correlated with a brightness of pixels in the first initial image;
control all or a part of a display area of the display screen to display the second initial image to control all or the part of the display area of the display screen to emit at least one color of light to complement the target side when the first brightness is less than a preset brightness threshold;
control the image capturing circuit to capture a third initial image of the target side;
divide the third initial image into a plurality of parts;
calculate an average brightness value of each part of the plurality of parts;
determine an area on the target side corresponding to a part with a lowest average value as an area to be complemented with light;
control the image capturing circuit to capture a target image of the target side while the emitting circuit emits light to complement the target side; and
recognize the target image.

9. The image recognition apparatus according to claim 8, wherein the image recognition triggering operation is a triggering operation for an image recognition unlocking function of the electronic device, and the processing circuit is configured to:
unlock the electronic device based on a recognition result of the target image.

10. The image recognition apparatus according to claim 8, wherein the processing circuit is configured to:
control all or the part of the display area of the display screen to display a preset image.

11. The image recognition apparatus according to claim 8, wherein a light-emitting direction of the light-emitting circuit is adjustable, and the processing circuit is configured to:
adjust the light-emitting direction of the light-emitting circuit to enable the light-emitting circuit to emit light to the area to be complemented with light.

12. The image recognition apparatus according to claim 8, wherein the electronic device is further provided with a distance sensor configured to detect a target distance between the image capturing circuit and an obstacle on the target side, and the processing circuit is configured to:
acquire the target distance by means of the distance sensor;
determine a target brightness based on the target distance, wherein the target distance is positively correlated with the target brightness; and
control the light-emitting circuit to emit light having the target brightness to the target side.

13. The image recognition apparatus according to claim 8, wherein the processing circuit is configured to:
control the light-emitting circuit to complement the target side with light for a preset duration.

14. The image recognition apparatus according to claim 8, wherein the electronic device is further provided with an acceleration sensor, and the processing circuit is configured to:
acquire a moving direction of the electronic device through the acceleration sensor; and determine that the image recognition triggering operation is detected when the moving direction belongs to a preset direction set.

15. A non-transitory computer readable storage medium comprising instructions stored therein, wherein the instructions, when executed by a processing circuit, causes the processing circuit to perform the image recognition method according to claim 1.

* * * * *